United States Patent
Yu

(10) Patent No.: US 8,926,144 B2
(45) Date of Patent: Jan. 6, 2015

(54) LCD MODULE AND LCD DEVICE

(75) Inventor: Gang Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 265 days.

(21) Appl. No.: 13/578,212

(22) PCT Filed: Jul. 9, 2012

(86) PCT No.: PCT/CN2012/078343
§ 371 (c)(1),
(2), (4) Date: Aug. 9, 2012

(87) PCT Pub. No.: WO2014/000322
PCT Pub. Date: Jan. 3, 2014

(65) Prior Publication Data
US 2013/0343060 A1    Dec. 26, 2013

(30) Foreign Application Priority Data
Jun. 26, 2012  (CN) .......................... 2012 1 0212096

(51) Int. Cl.
*F21V 7/00* (2006.01)
*G02F 1/1335* (2006.01)

(52) U.S. Cl.
CPC ............ *F21V 7/00* (2013.01); *G02F 1/133605* (2013.01)
USPC ............ 362/341; 362/609; 362/327; 362/350

(58) Field of Classification Search
CPC .. G02B 26/0833; G02B 6/0055; G02B 6/005; G02B 26/0816; G02F 1/133603
USPC .......... 362/609, 341, 327, 347, 350; 359/871, 359/872, 847
See application file for complete search history.

(56) References Cited

U.S. PATENT DOCUMENTS

| | | | |
|---|---|---|---|
| 4,703,174 A * | 10/1987 | Anderson et al. ......... | 250/227.21 |
| 2001/0000130 A1* | 4/2001 | Aoki ............................ | 359/198 |
| 2005/0018329 A1* | 1/2005 | Pesik ........................... | 359/883 |
| 2009/0103158 A1* | 4/2009 | Shirai et al. ................ | 359/221.2 |
| 2009/0206052 A1* | 8/2009 | Maeda et al. ................. | 216/24 |
| 2012/0274770 A1* | 11/2012 | Lee .............................. | 348/148 |
| 2013/0044515 A1* | 2/2013 | Lu Feng et al. ............. | 362/609 |

FOREIGN PATENT DOCUMENTS

| | | |
|---|---|---|
| CN | 2549495 Y | 5/2003 |
| CN | 101114078 A | 1/2008 |
| CN | 101216633 A | 7/2008 |
| CN | 101770111 A | 7/2010 |
| CN | 102231015 A | 11/2011 |
| CN | 202228998 U | 5/2012 |
| CN | 102686072 A | 9/2012 |
| JP | 2001-183696 A | 7/2001 |

OTHER PUBLICATIONS

Zhou Yu, The International Searching Authority written comments, Apr. 2013, CN.
* cited by examiner

*Primary Examiner* — Nimeshkumar Patel
*Assistant Examiner* — Kevin Quarterman
(74) *Attorney, Agent, or Firm* — IPro, Inc.; Na Xu

(57) ABSTRACT

The present disclosure provides a liquid crystal display (LCD) module and an LCD device. The LCD module includes a backplane, and a reflector sheet arranged on the backplane. The backplane is configured with a plurality of reinforced structures, a plurality of concave parts are formed between the reinforced structures, and the reflector sheet is arranged over the reinforced structures. The concave part(s) is configured with a support member used for supporting the reflector sheet. In the present disclosure, because the concave part of the backplane is configured with a support member used for supporting the reflector sheet, the reflector sheet is prevented from deforming and being depressed on the concave part of the backplane because of no support, and the reflector sheet is prevented from abnormally reflecting light because of deformation, thereby increasing the display effect of the LCD device.

10 Claims, 3 Drawing Sheets

LCD MODULE AND LCD DEVICE

TECHNICAL FIELD

The present disclosure relates to the field of liquid crystal displays (LCDs), and more particularly to an LCD module and an LCD device.

BACKGROUND

As a core component of a liquid crystal display (LCD) device, an LCD module is used for providing display and brightness for the LCD device. As shown in FIG. 1, in the design of a conventional LCD module, a reflector sheet 100 is assembled on a backplane 200. Because of strength requirements, the backplane 200 is configured with convex reinforced structures 210, and concave parts 220 are formed between the reinforced structures 210. The reinforced structures 210 are upward protruded and used for supporting the reflector sheet 100, but the concave parts 220 cannot support the reflector sheet 100. Therefore, the reflector sheet corresponding to the concave parts 220 may be downward bent (as shown in FIG. 2), and then adverse effects may be caused to the display effect of the whole LCD module. Particularly for the thin reflector sheet, the bending phenomenon is more obvious.

FIG. 2 shows a schematic diagram of a bent reflector sheet. The reason of the reflector sheet 100 being bent is that the concave parts 220 do not support the reflector sheet 100, causing abnormal reflected light of the reflector sheet 100 after bending, and then causing abnormal display of the LCD module.

SUMMARY

In view of the above-described problems, the aim of the present disclosure is to provide a liquid crystal display (LCD) module and an LCD device with excellent display effect.

The aim of the present disclosure is achieved by the following technical scheme.

An LCD module comprises a backplane, and a reflector sheet arranged on the backplane. The backplane is configured with a plurality of reinforced structures, a plurality of concave parts are formed between the reinforced structures, and the reflector sheet is arranged over the reinforced structures. The concave part(s) is configured with a belleville spring used for supporting the reflector sheet, one end of the belleville spring with smaller outer diameter is arranged on the backplane, and the other end of the belleville spring with larger outer diameter is used for supporting the reflector sheet; the spring end used for supporting the reflector sheet is configured with a support sheet, and the support sheet is fixed to the spring.

The aim of the present disclosure is further achieved by the following technical scheme.

An LCD module comprises a backplane, and a reflector sheet arranged on the backplane. The backplane is configured with a plurality of reinforced structures, a plurality of concave parts are formed between the reinforced structures, and the reflector sheet is arranged over the reinforced structures. The concave part(s) is configured with a support member used for supporting the reflector sheet.

In one example, the support member is an elastic support member. Because of a problem of machining accuracy, an inelastic support member may be larger than or less than a depth of the concave part. Thus, when supporting, the reflector sheet may form a convex shape in the support position or depress because the reflector sheet cannot play a role of support. However, the elastic support member has a buffer distance, thereby effectively playing a role of support.

Preferably, the elastic support member is a spring. The spring has better elasticity.

Preferably, the spring is a belleville spring. One end of the belleville spring with smaller outer diameter is arranged on the backplane, and the other end of the belleville spring with larger outer diameter is used for supporting the reflector sheet. The end of the belleville spring with larger outer diameter can provide wider support range, thereby preventing the convex shape from being formed on the reflector sheet.

Preferably, the spring end used for supporting the reflector sheet is configured with a support sheet, and the support sheet is fixed to the spring. A support surface is configured by the support sheet, thereby more effectively protecting the reflector sheet.

Preferably, the support member is an elastic rubber column. Rubber has good elasticity. Good support effect can be obtained by selecting rubber with appropriate elasticity. Moreover, the cost of rubber is relatively low.

Preferably, the elastic rubber column is bonded to the backplane. Rubber can be fixed by a bonding mode which is simple.

Preferably, the support member is an elastic rubber long block. The opposite upper surface and lower surface of the elastic rubber long block are respectively fixed on the backplane and supported on the bottom surface of the reflector sheet. The elastic rubber long block can provide a support surface with wider range.

Preferably, a length of the elastic rubber long block is equal to the width of the reflector sheet. Thus, the reflector sheet can be supported on the overall concave part.

An LCD device comprises the LCD module mentioned above.

In the present disclosure, because the concave part of the backplane is configured with a support member used for supporting the reflector sheet, the reflector sheet is prevented from deforming and being depressed on the concave part of the backplane because of no support, and the reflector sheet is prevented from abnormally reflecting light because of deformation, thereby increasing the display effect of the LCD device.

Legends: 100 reflector sheet; 200. backplane; 210. reinforced structure; 220. concave part; 300. screw; 310. belleville spring; 311. support sheet; 320. rubber column; 330. rubber long block.

DETAILED DESCRIPTION

The present disclosure will be further described in accordance with the figures and preferred examples.

Example 1

Figure 1:
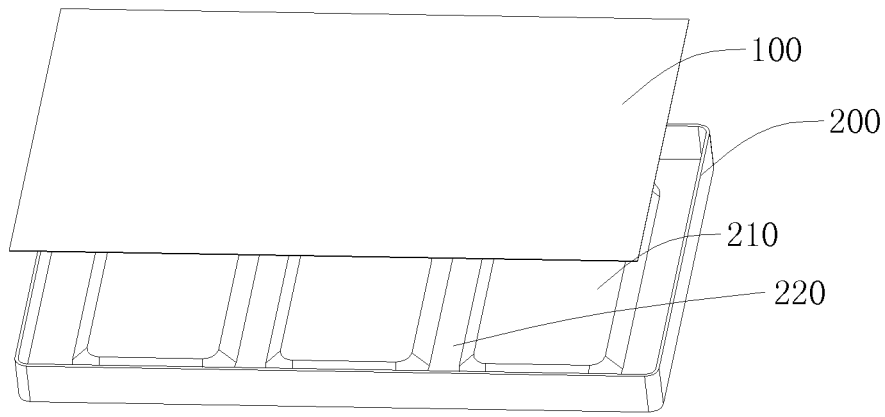
FIG. 1 is a simplified structure diagram of a reflector sheet and a backplane of an LCD module in the prior art.
Figure 2:
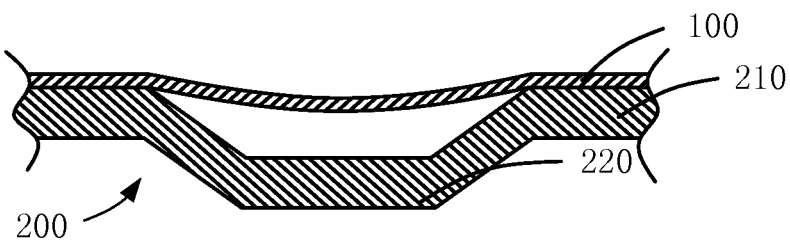
FIG. 2 is a schematic diagram of a reflector sheet which is depressed when arranging on a backplane in an LCD module in the prior art.
Figure 3:
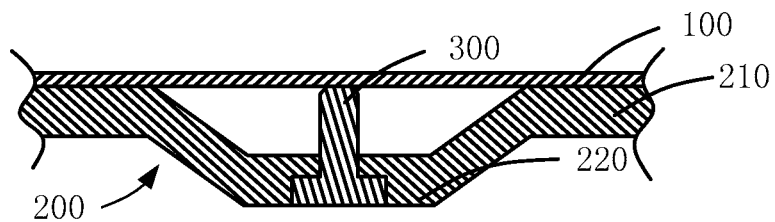
FIG. 3 is a simplified structure diagram of a backplane configured with a support member of a first example of the present disclosure.

FIG. 3 shows a specific example of the present disclosure. A liquid crystal display (LCD) module of an LCD device comprises a backplane 200, and a reflector sheet 100 arranged on the backplane 200. The backplane 200 is configured with convex reinforced structures 210, the reflector sheet 100 is arranged over the reinforced structures 210, a concave part 220 is formed between every two adjacent convex reinforced structures 210, and the concave part 220 is configured with a screw 300 used for supporting the reflector sheet 100.

Example 2

In the first example shown in FIG. 3, when using the screw 300 to support the reflector sheet 100, because of an accuracy error of screws 300 during manufacture, the screws 300 are different in length. If the screw(s) 300 is slightly long, the screw 300 may jack up the reflector sheet 100, resulting in local protrusion on the reflector sheet 100. If the screw 300 is slightly short, the screw 300 cannot effectively support the reflector sheet 100 so that a depression is formed in the support position. Or if the screw 300 is loosened when being screwed, the screw 300 cannot effectively support the reflector sheet 100. Both the protrusion and depression formed on the reflector sheet 100 can affect the reflection of the reflector sheet 100 to light, thereby affecting the display effect of the LCD module.

Figure 4:
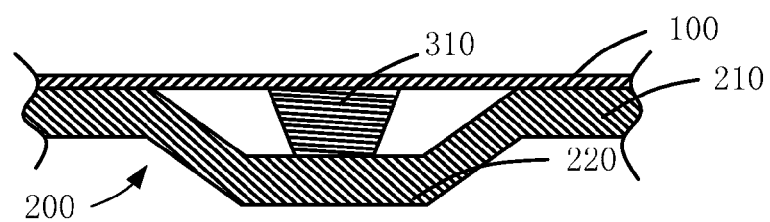
FIG. 4 is a simplified structure diagram of a backplane configured with a support member of a second example of the present disclosure.
Figure 5:
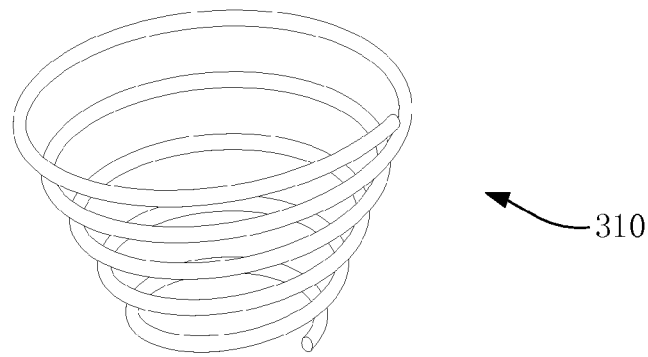
FIG. 5 is a simplified structure diagram of a support member of a second example of the present disclosure.

FIG. 4 and FIG. 5 show an improvement of the first example. In the example, the support member used for supporting the reflector sheet 100 is changed into an elastic support member. The elastic support member can provide a buffer distance. Under the own gravity of the reflector sheet 100, the elastic support member is pressed. Thus, a topmost end of the support member and the reinforced structures 210 of the backplane 200 are in the same plane, and the elastic support member can still play a role of support under action of own gravity. Spring is a preferable elastic support member. In the example, the spring is a belleville spring 310 shown in FIG. 5. As shown in FIG. 4, one end of the belleville spring 310 with smaller outer diameter is arranged on the concave part 220 of the backplane 200, and the other end of the belleville spring 310 with larger outer diameter is directly in contact with the reflector sheet 100 and used for supporting the reflector sheet 100. The reflector sheet 100 is supported by the end of the belleville spring 310 with larger outer diameter, thereby providing wider support range. Thus, the reflector sheet 100 is prevented from deforming because of excessive local pressure.

Figure 6:
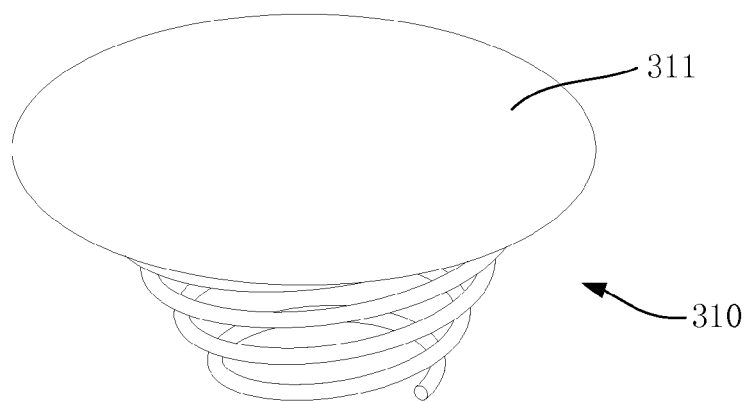
FIG. 6 is a simplified structure diagram of a support member configured with a support sheet of a second example of the present disclosure.

FIG. 6 shows a further improvement of the second example. The belleville spring 310 is configured with a support sheet 311, and the support sheet 311 can provide a support surface is configured, thereby preventing the reflector sheet 100 from deforming because of excessive intensity of pressure. Optionally, the reflector sheet 100 can be protected without providing support by the end of the belleville spring with larger diameter if an ordinary cylindrical spring is configured with a support sheet.

Figure 7:
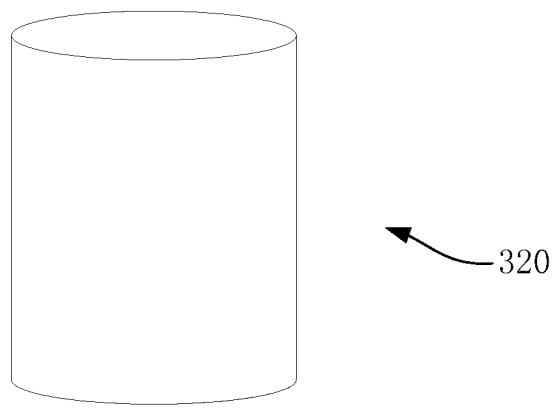
FIG. 7 is a simplified structure diagram of another support member of a second example of the present disclosure.

As one alternative scheme of the second example, the elastic support member can be a rubber column 320 shown in FIG. 7. The rubber column 320 has good elastic property. Because the reflector sheet is not heavy, the rubber column 320 can be high-elasticity soft rubber sponge. Another advantage of using rubber column as support member is that the rubber column 320 can be directly bonded to the concave part 220 of the backplane 200 by glue without drilling holes (as shown in FIG. 3) or arranging other fixing structures used for fixing the support member.

Figure 8:
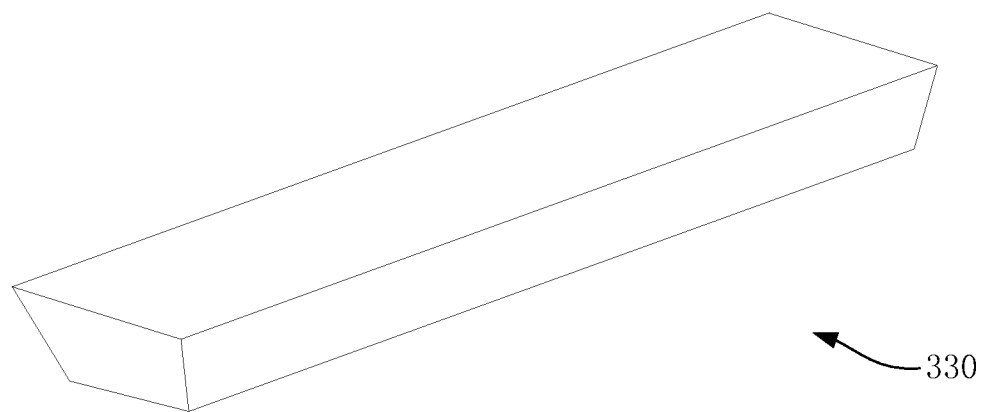
FIG. 8 is a simplified structure diagram of a third support member of a second example of the present disclosure.

As another alternative scheme of the second example, the elastic support member can be a rubber long block 330 shown in FIG. 8. Optionally, the rubber long block 330 can also be high-elasticity soft rubber sponge preferably. The length of the rubber long block 330 is equal to the width of the reflector sheet 100. Thus, the rubber long block 330 can provide a continuous support surface, to enable the reflector sheet 100 over the overall concave part 220 to be supported, thereby preventing the reflector sheet 100 from locally being depressed on the concave part 220.

The present disclosure is described in detail in accordance with the above contents with the specific preferred examples. However, this present disclosure is not limited to the specific examples. For the ordinary technical personnel of the technical field of the present present disclosure, on the premise of keeping the conception of the present present disclosure, the technical personnel can also make simple deductions or replacements, and all of which should be considered to belong to the protection scope of the present present disclosure.

I claim:

1. A liquid crystal display (LCD) module, comprising:
a backplane comprising a plurality of reinforced structures, and
a reflector sheet arranged on the backplane;
wherein a plurality of concave parts are formed between the reinforced structures, and the reflector sheet is arranged over the reinforced structures;
wherein each of the concave parts is configured with a belleville spring used for supporting the reflector sheet, one end of the belleville spring with smaller outer diameter is arranged on the backplane, and the other end of the belleville spring with larger outer diameter is used for supporting the reflector sheet.

2. A liquid crystal display (LCD) module, comprising:
a backplane comprising a plurality of reinforced structures, and
a reflector sheet arranged on the backplane;
wherein a plurality of concave parts are formed between the reinforced structures, and the reflector sheet is arranged over the reinforced structures;
wherein each of the concave parts is configured with a support member used for supporting the reflector sheet.

3. The LCD module of claim 2, wherein the support member is an elastic support member.

4. The LCD module of claim 3, wherein the elastic support member is a spring.

5. The LCD module of claim 4, wherein the spring is a belleville spring; one end of the belleville spring with smaller outer diameter is arranged on the backplane, and the other end of the belleville spring with larger outer diameter is used for supporting the reflector sheet.

6. The LCD module of claim 4 or claim 5, wherein the spring end used for supporting the reflector sheet is configured with a support sheet, and the support sheet is fixed on the spring.

7. The LCD module of claim 3, wherein the support member is an elastic rubber column.

8. The LCD module of claim 7, wherein the elastic rubber column is bonded to the backplane.

9. The LCD module of claim 3, wherein the support member is an elastic rubber long block; an upper surface and lower surface opposite to the upper surface of the elastic rubber long block are respectively fixed on the backplane and supported on a bottom surface of the reflector sheet.

10. The LCD module of claim 9, wherein a length of the elastic rubber long block is equal to a width of the reflector sheet.

* * * * *